Figure 1:
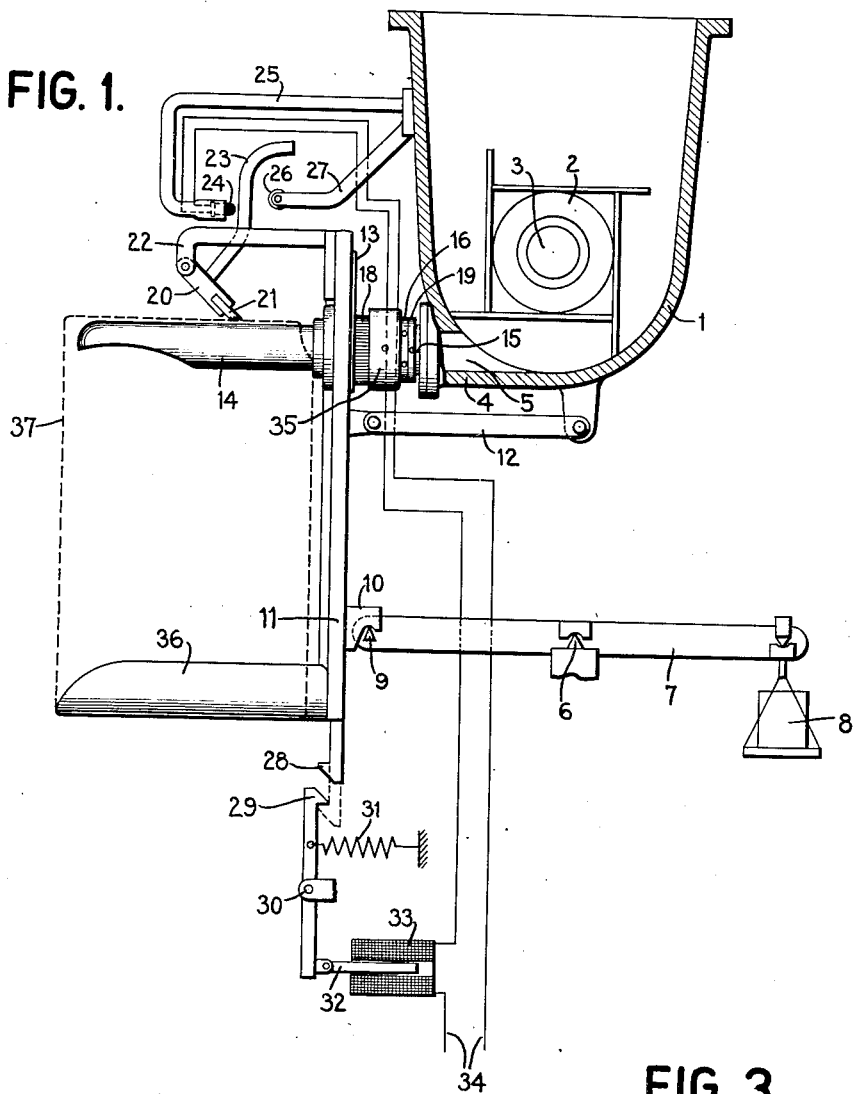

May 28, 1940.

F. W. HAVER 2,202,655

BAG FILLING MACHINE

Filed Dec. 8, 1937

INVENTOR
Fritz W. Haver
BY
Ward Crosby Neal
ATTORNEYS

Patented May 28, 1940

2,202,655

UNITED STATES PATENT OFFICE 2,202,655

BAG FILLING MACHINE

Fritz W. Haver, Oelde Westphalia, Germany

Application December 8, 1937, Serial No. 178,669
In Germany December 12, 1936

7 Claims. (Cl. 226—48)

This invention relates to valve bag filling machines adapted to feed a predetermined weight of material into bags to be filled.

Machines of this type are usually provided with a filling tube on which bags are clamped, and the tube is connected with a weighing device in such manner that upon delivery of a predetermined quantity of filling material to the bag the tube moves downwardly; the feed being thereupon discontinued by suitable provision. The bag is then released and discharged and thereafter the parts have to be restored to initial position, an empty bag supplied to the filling tube and the filling passage placed in communication with the feed hopper. The period of time required for only filling and weighing is a more or less fixed constant, within the practical limits of this type of machine; but the period between the completion of one weighing operation and the commencement of the succeeding weighing operation has heretofore presented difficulties of operation with resultant loss of time.

Attempts to solve these problems have resulted, on the one hand, in complicated mechanisms and, on the other hand, the provision of plural operations dependent on the human factor. These disadvantages inherent in the said previous machines required considerable attention or resultant error, and therefore were detrimental from the standpoint of speed of production.

Furthermore, in machines of this type the material is forcefully introduced through the filling tube admixed with air; and if the movable tube is in sufficiently close wiping contact to prevent escape of this material under pressure such a degree of friction is created between the relatively movable parts as to cause inaccuracy in the weight desired, while if a free space is provided too great an escape of material results.

An object of the invention is to provide an accurate weighing machine which is adapted to be operated with improved efficiency and greater productive capacity by avoiding the disadvantages pointed out.

The invention consists in the novel features, arrangements and combination of parts embodied by way of example in the apparatus hereinafter described as illustrating the preferred form of the invention, and the invention will be more particularly pointed out in the appended claims.

Further objects and advantages of the invention will more fully appear from the following description taken in connection with the accompanying drawing, which shows, by way of example, the preferred embodiment of the invention.

Figure 2:
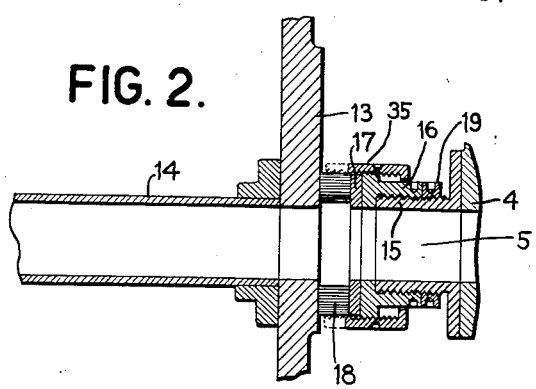
Figure 3:
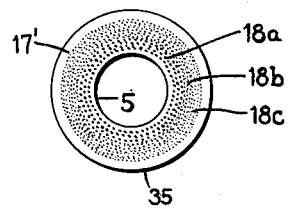

Referring to the drawing in which the same reference characters indicate the same parts in the various views:

Fig. 1 is a partially diagrammatic side elevation of the machine, with certain parts broken away to more clearly disclose certain parts of the mechanism, Fig. 2 is an enlarged cross-sectional view of certain details of Fig. 1 in order to more clearly illustrate certain features of the invention, and Fig. 3 is a cross-sectional view illustrating a modified form of brush.

Since machines of this general type are well understood to those skilled in the art, only such features have been shown in the drawing as will be necessary for a clear understanding of the invention. For instance, a structural framework for supporting the mechanism, the means for driving the discharge paddle wheel or agitator, and other general structural details common and well understood in the art have been omitted for purposes of brevity and clarity. It is also understood by those skilled in the art that a plurality of filling units are most generally associated in a single frame in order to minimize space and cost and facilitate operation; but for purposes of the present invention it is deemed unnecessary to unduly multiply the drawing and description by illustrating a plurality of identical units mounted in a single structure.

Referring to the drawing, and more particularly to Fig. 1: a hopper 1 is mounted on a suitable supporting frame and is adapted to contain the filling material, such as cement. A paddle wheel or discharge agitator 2 is supported within the hopper 1 on a suitably journaled drive shaft 3 which is adapted to be connected to a suitable source of power. The hopper 1 is provided with a feed tube 4 having a discharge throat 5. A fulcrum point 6 is rigidly supported in suitable framework of the machine and carries pivotally supported thereon fulcrum arm means 7 provided with a suitable counterweight such as 8. The other end of the fulcrum arm 7 is provided with suitable fulcrum point means 9 in supporting engagement with a rearwardly projecting portion 10 rigidly attached to a frame 11 which is restricted to a substantially vertical movement such as by a parallel motion link 12, while being pivotally mounted in weighing relationship on the fulcrum point 6. The frame 11 is provided adjacent its upper end (Fig. 2) with a plate 13, to which is rigidly attached a filling tube 14 which in normal filling operation, illustrated in Figs. 1 and 2, is in register with the passageway 5 of the feed tube 4. The feed tube 4 is provided at its outer end with a threaded portion 15 in cooperative engagement with a sleeve 16, to the outer face of which is rigidly secured the back of the circular brush 17 which is provided with bristles 18, whose outer ends are in wiping engagement with the rear face of plate 13. By screwing the collar 16 in an axial direction, the bristles 18 may be so adjusted as to exert the desired degree of pressure against the plate 13, and the bristles may be retained in the desired setting by means of a lock nut 19. The bristles 18 are preferably made of organic material, such as hair, and are positioned in such close proximity as to provide a suitable filter permitting the escape of air therethrough while preventing or substantially retarding the escape of filling material. When the bristles are pressed against the plate 13 until they are somewhat flexed, a most effective seal is produced which, due to the flexibility of the bristles, does not adversely affect the accuracy of weighing. The degree of pressure exerted on the bristles and the corresponding flexure thereof serves to vary the degree of filtering action and seal.

The clamping arm (Fig. 1) 20, preferably provided with a rubber friction block 21, is pivotally supported on the outer end of an arm 22 which is rigidly attached at its inner end and carried by the frame 11. The clamping arm 20 is provided with a control extension 23 which has an intermediate substantially vertical portion and an upper inwardly curved end. The intermediate substantially vertical portion is disposed adjacent an electrical push button 24 supported by an arm 25 rigidly secured to the hopper 1; and the upper inwardly extending curved end of the arm 23 is positioned over a cam roller 26 or striking pin carried on the outer end of an arm 27 rigidly attached to the hopper 1.

The lower end of the frame 11 carries a locking hook 28, which in the present embodiment is illustrated adjacent its lower extremity, and a cooperating latch 29 is positioned immediately beneath the hook 28 and in its path of movement, being pivotally supported on a stationary part of the mechanism as at 30 and yieldably held in engaging position as by means of a helical spring 31 secured on a stationary part of the mechanism. The hook and latch parts are so arranged that upon downward movement of the hook 28 with the frame 11 to the dotted position shown, the latch 29 will engage the hook in its downward position so as to lock the frame 11. The latch 29 is provided with a downwardly extending portion to which is pivotally attached a movable solenoid plunger 32 adapted to be actuated by the solenoid 33, which is connected to a suitable source of electrical energy by means of the lines 34. The lines 34 include in the circuit with the solenoid 33 contacts actuated by the push button 24 carried on the arm 25.

Modifications

Instead of the more or less regular arrangement of bristles as previously described in connection with Fig. 2, in some cases it may be preferable to use the special arrangement of bristles indicated in Fig. 3 wherein the brush 17' is provided with a plurality of zones of bristles 18a, 18b and 18c arranged concentrically; the inner zone 18a being comprised of bristles arranged and spaced in such a way as to perform an initial partial filtering, the intermediate zone 18b having the bristles more closely spaced to perform the second stage of filtering and the bristles 18c being yet more closely spaced to perform the final filtering stage. By this spacing the filtering action is graduated and it has been found that this graduation is more efficient, particularly with higher pressures of the mixed filling material and air, serving to effectively prevent or retard the escape of filling material while permitting the escape of air. The multi-zone bristles of the modified form of brush may also be flexed in varying degrees, as in the case of the previously described embodiment, to thereby vary the filtering action.

I have further found that additional regulation of the filtering action may be desirably effected by inhibiting the filtering action throughout any any desired area of the bristles. For example, (Fig. 2) by the provision of a sleeve 35 in threaded engagement with the exterior of the collar 16 so as to permit adjustment of said sleeve in an axial direction thereof throughout the range of positions indicated from the solid to the dotted lines. By screwing the sleeve 35 outwardly, the free filtering area of the bristles may be varied from substantially zero to the maximum while still retaining the desired seal between the outer ends of the bristles and the relatively movable plate 13.

As is well understood by those skilled in the art, in addition to supporting the bag to be filled on the filling tube, such as 14, additional provision may be made on the movable part of the scales or weighing mechanism for partially supporting the bag and contents during the filling operation and prior to the discharge of the filled bag. Such additional or supplementary supporting means is illustrated in Fig. 1 wherein 36 represents a saddle or shelf rigidly secured to the movable frame 11 and so spaced from the spout 14 that as the bag is increasingly filled, a part of the weight is carried by the shelf 36. While such supplementary supporting means is not essential, it is highly desirable from a practical production standpoint since it prevents an undue strain on the mouth of the bag when approaching filled condition, and is especially useful in relieving undue strains from the bag when the filled bag is being discharged.

Operation

With the mechanism in the position shown in Fig. 1, the material is placed in the hopper and agitated and discharged by means of the paddle mechanism 2 through the feed tube 4 and the filling tube 14 into the bag 37, indicated by the dotted lines, the bag being clamped to the tube by the clamping arm 20. As the bag is being filled, the bristles 18 permit the escape of entrained air while serving to prevent the substantial escape of filling material; and more especially provide for an effective seal with a minimum of frictional resistance, to thereby assure accuracy of weighing. When the predetermined weight is delivered into the bag, the movable part of the weighing mechanism, comprising the frame 11 and connected parts, moves downwardly. Such downward movement brings the upper curved end of the control arm 23 into engagement with the cam roller 26 immediately prior to the parts reaching their lowermost position, and this engagement slightly lifts the clamping arm 20 a sufficient distance to permit the withdrawal of the bag but not sufficient to deflect the vertical portion of the arm 23 into operating engagement with the push button 24. This downward movement also moves the filling tube out of register with the feed tube to thereby interrupt the flow of filling material; the brush 18 maintaining a closure seal against the solid rear face of plate 13. As the parts reach their downward position, the latch 29 engages the hook 28 to thereby lock the parts in their downward position. In this position the filled bag is discharged and the device is ready to be returned to filling position and to receive the next empty bag. The operator grasps the empty bag adjacent its upper end and inserts it over the filling tube 14 and as he pushes it on to the tube, his hand engages the clamp 20 to cause it to be further lifted, and this action simultaneously causes the vertical portion of the control arm 23 to actuate the push button 24 to thereby close the electrical circuit and energize the solenoid 33, which actuates the solenoid plunger 32 in an inward direction to thereby release the latch 29 and permit the weighing mechanism to return to its normal filling position under the influence of the weight 8. It will be appreciated from the foregoing that one of the frequently encountered difficulties of the prior art has been overcome by this feature of applicant's invention, i. e. by the construction and arrangement provided by applicant the weighing mechanism is released for return to filling position and the feed throat opened only as a result of an empty bag being placed upon the tube in position to be filled. For all practical purposes this entirely eliminates the human factor previously encountered, wherein the operator inadvertently returned the mechanism to filling and weighing position and opened the feed throat before an empty bag had been placed on the spout to receive the material, with resultant waste and loss of operative time; whereas applicant's invention insures the elimination of such wastage of material and loss of operative time. While other suitable electromotive means may be utilized, it is preferable that contact-free means (such as the solenoid core 32 and the solenoid 33) be employed since motive means which are dependent upon frictional contact for actuation (such as the brush to commutator contact of the ordinary electric motor) are subject to operating disadvantages in view of the great amount of dust always present where powdered filling material is being handled in such quantities.

Having thus described my invention with particularity with reference to the preferred embodiment of the same, and having referred to some of the possible modifications thereof, it will be obvious to those skilled in the art after understanding my invention, that other changes and modifications may be made therein without departing from the spirit and scope of the invention, and I aim in the appended claims to cover such changes and modifications as are within the scope of the invention.

What I claim is:

1. In a valve bag filling machine, the combination of weighing mechanism, a filling tube mounted on said weighing mechanism for receiving a bag to be filled and movable downwardly with said weighing mechanism upon a predetermined weight of filling material being deposited in said bag through said tubes, means for locking said weighing mechanism in its downward position, means for clamping a bag on said filling tube, said clamping means being operable to a first stage of open position for releasing a filled bag for removal therefrom and to a second stage of open position for releasing said locking means, and so contructed and arranged that it automatically releases said locking means by the movement of said clamping means to said second stage of open position as an empty bag is inserted upon said filling tube.

2. In a valve bag filling machine, the combination of weighing mechanism, a filling tube mounted on said weighing mechanism for receiving a bag to be filled and movably downwardly with said weighing mechanism upon a predetermined weight of filling material being deposited in said bag through said tube, means for releasably locking said weighing mechanism in its downward position, means for clamping a bag on said filling tube, said clamping means being operable to a first stage of open position for releasing a filled bag for removal therefrom and to a second stage of open position for releasing said locking means, and means so constructed and arranged that it is actuated to release said locking means by the movement of said clamping means to said second stage of open position.

3. In a valve bag filling machine, the combination of weighing mechanism, a filling tube mounted on said weighing mechanism for receiving a bag to be filled and movable downwardly with said weighing mechanism upon a predetermined weight of filling material being deposited in said bag through said tube, means for locking said weighing mechanism in its downward position, upwardly and downwardly movable means for clamping a bag on said filling tube, an electrical circuit closing device in the path of movement of said clamping means and constructed and arranged to be actuated by said clamping means, and electromotive means in circuit with said circuit closing device for releasing said locking means, whereby said releasing means is controlled by said clamping means.

4. In a valve bag filling machine, the combination of weighing mechanism, a filling tube mounted on said weighing mechanism for receiving a bag to be filled and movable downwardly with said weighing mechanism upon a predetermined weight of filling material being placed in said bag, means for clamping a bag on said filling tube, means for locking said weighing mechanism in its downward position, means operable by the downward movement of said weighing mechanism for raising said clamping means to an intermediate position to thereby release said filled bag for removal, and means operated by the movement of said clamping means to an upper position for releasing said locking means.

5. In a valve bag filling machine, the combination of weighing mechanism, a filling tube mounted on said weighing mechanism for receiving a bag to be filled and movable downwardly with said weighing mechanism upon a predetermined weight of filling material being deposited in said bag through said tube, a relatively fixed feed tube in feeding register with said filling tube when said bag is being filled, means for forcefully feeding filling material admixed with air through said tubes when in register, and a hollow brush interposed between said feed and filling tubes and providing a resilient seal retarding the escape of filling material therefrom while permitting the escape of entrained air.

6. In a valve bag filling machine, the combination of weighing mechanism, a filling tube mounted on said weighing mechanism for receiving a bag to be filled and movable downwardly with said weighing mechanism upon a predetermined weight of filling material being deposited in said bag through said tube, a relatively fixed feed tube in feeding register with said filling tube when said bag is being filled, means for forcefully feeding filling matrial admixed with air through sad tubes when in register, and a hollow brush interposed between said feed and filling tubes, said brush comprising bristles arranged in a plurality of circular zones with respective zones varying in filtering action so as to provide a graduated filter action serving to permit air under pressure to escape while preventing substantial escape of said filling material.

7. In a valve bag filling machine, the combination of weighing mechanism, a filling tube mounted on said weighing mechanism for receiving a bag to be filled and movable downwardly with said weighing mechanism upon a predetermined weight of filling material being deposited in said bag through said tube, a relatively fixed feed tube in feeding register with said filling tube when said bag is being filled, means for forcefully feeding filling material admixed with air through said tubes when in register, and a hollow brush interposed between said feed and filling tubes said brush having bristles whose outer ends are in wiping engagement with a surface of one of said relatively movable members and said bristles providing a resilient seal retarding the escape of filling material therefrom while permitting the escape of entrained air, and an axially adjustable sleeve surrounding said bristles for varying the effective filtering area.

F. W. HAVER.

CERTIFICATE OF CORRECTION.

Patent No. 2,202,655.　　　　　　　　　　　　　May 28, 1940.

FRITZ W. HAVER.

It is hereby certified that error appears in the printed specification of the above numbered patent requiring correction as follows: Page 1, first column, line 44, before the word "pointed" insert --previously--; page 2, second column, line 18, strike out the word "any"; page 3, second column, line 3, claim 1, after "and" insert --means--; line 40, claim 3, after the comma and before "whereby" insert --and so constructed and arranged that it is energized therethrough upon the lifting of said clamping means,--; page 4, first column, line 6, claim 6, for "matrial" read --material--; line 7, same claim, for "sad" read --said--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.